Jan. 26, 1954
J. H. KAUFFMAN
2,667,422
PACKAGING AND DISPENSING FROZEN
BEVERAGE FORMING CONCENTRATES
Filed July 9, 1952
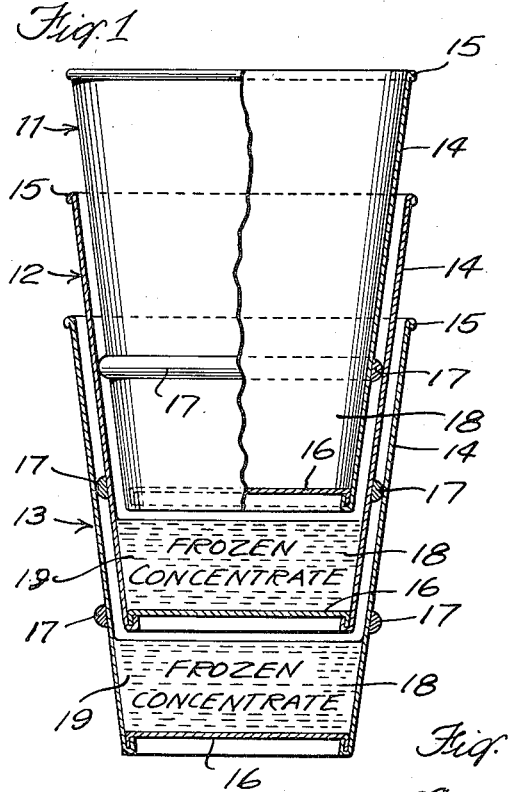
Fig. 1
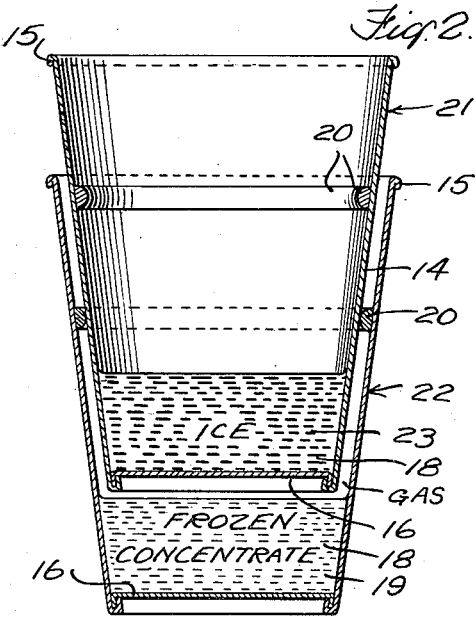
Fig. 2
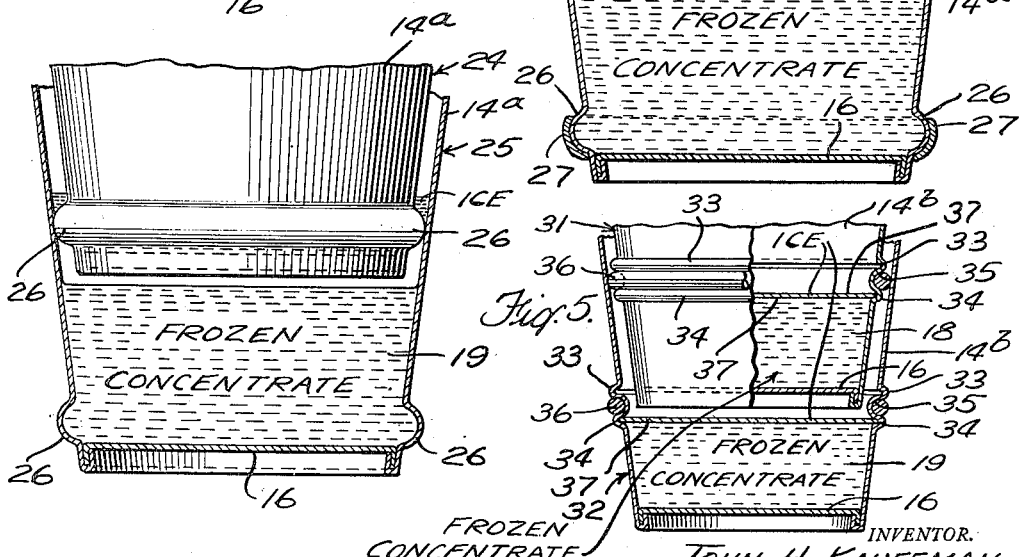
Fig. 4
Fig. 3.
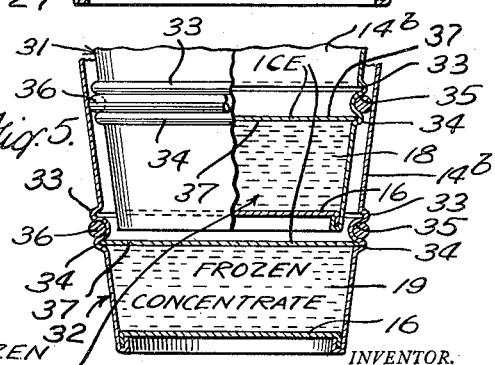
Fig. 5.
INVENTOR.
JOHN H. KAUFFMAN
BY
ATTORNEY

Patented Jan. 26, 1954

2,667,422

UNITED STATES PATENT OFFICE 2,667,422

PACKAGING AND DISPENSING FROZEN BEVERAGE FORMING CONCENTRATES

John H. Kauffman, Eustis, Fla.

Application July 9, 1952, Serial No. 297,862

13 Claims. (Cl. 99—171)

This invention relates to the packaging and dispensing of food concentrates and most particularly to the provision of new and improved packages and methods of packaging and dispensing unpasteurized "frosted" or frozen beverage forming citrus and other fruit and/or vegetable concentrates wherein the concentrates are sealed in cheap disposable containers in which they remain in storage at suitable temperatures until use and in which they are diulted to the desired beverage strength and dispensed.

In the preferred embodiment herein described and illustrated, my invention comprises the use of paper cups containing predetermined quantities of concentrate, nested in space saving stacks wherein an airproof seal is effectively achieved between the sidewalls of adjacent cups, particularly adapted for use in coin-operated and other dispensing machines or units of extreme simplicty, low cost and efficiency while requiring minimum servicing for maintaining them sterile and hygienic in operation since their parts are never contacted by the concentrate. The latter is an important feature of the invention since unpasteurized citrus and other concentrates, in the presence of air, begin immediately to spoil of themselves, deposit upon and befoul and/or corrode metallic, plastic, and other surfaces with which they come in contact. Since, according to this invention, the concentrate remains always within the confines of the cup and is exposed to the atmosphere only for a matter of a few seconds while water or other diluent is introduced into the cup and mixed therewith, immediately before removal of the cup and its contents, this problem is effectively solved. By utilizing the principles of this invention unpasteurized "frosted" or fresh frozen citrus and other juice concentrates may be cheaply and efficiently packaged, stored and dispensed commercially.

It is a further object of this invention to provide such methods and packages wherein and whereby spoilage of unpasteurized frozen or "frosted" concentrate is inhibited by prevention of direct air-concentrate contact within the packages or cups until the seals are broken prior to the mixing and dispensing operations.

These and other objects and advantages of the invention will clearly appear from the following description taken with the drawing, forming a part thereof, and will be pointed out in the appended claims.

In the drawing:

Fig. 1 is a view in elevation, and partly in section, illustrating the upper end portion of a stack of nested frozen concentrate containing disposable containers in the form of modified commercial paper cups according to one preferred embodiment of my invention;

Fig. 2 is a view generally similar to Fig. 1 showing a modification thereof, with the adjacent nested cups shown in section;

Fig. 3 is a fragmentary view, partly in elevation and partly in section, illustrating a modified form of cup with the cup spacing means formed integrally therein and illustrating a modified form of cup seal;

Fig. 4 is a fragmentary view of one of the cups shown in Fig. 3 and illustrating the application thereto of protective coatings and stripe or band coatings to enhance the intercup seal; and Fig. 5 is a view generally similar to Fig. 3 but illustrating another form of cup seal or sealing means.

Referring to the drawing in detail, the cups 11, 12 and 13 shown in Fig. 1 are similar and are each formed by modification of a commercial paper cup formed by a frusto-conical sidewall 14 turned over upon itself at its upper end to form an annular bead or lip 15 and having a circular disklike bottom wall 16 secured thereto in fluid-tight manner by crimping. While cups of widely varying types and sizes are readily adaptable and suited to the practice of my invention, the illustrative commercial seven ounce (7 oz.) capacity cup shown in Fig. 1 and known in the trade as the "Dixie" #27 is particularly adapted for such use to contain 1½ oz. of unpasteurized "frosted" or frozen fresh citrus or other beverage forming juice concentrate to which 4½ oz. of water at suitable temperature is added and mixed within the cup (11, 12 or 13) to form the unit dispensed which contains 6 oz. of beverage.

As shown in Fig. 1, these commercial cups are modified by the provision of spacing means comprising annular bands or ring members 17 secured in suitable manner, as hereinafter described, in suitable location on the exterior surfaces of the cup sidewalls 14. These spacing means or members 17 are of such radial extent that a suitable spacing of the stacked or nested cups is effected to produce a space or chamber 18 adapted to contain the above described desired predetermined quantity (1½ oz.) of "frosted" or frozen concentrate 19 out of contact with the bottom portion of the cup next above in the stack. While only three nested cups 11, 12 and 13 are shown as comprising the stack portion shown in Fig. 1, it is, of course, to be understood that the size or heights of the stacks formed and used according to this invention will be dictated solely by convenience and space available.

The cups 21 and 22 of the embodiment shown in Fig. 2 are similar to one another and to the cups 11, 12 and 13 described above and shown in Fig. 1 except that the annular band or ring members 20 which are functionally equivalent to the members 17 are secured in suitable location to the interior sidewalls 14 of the cups 21 and 22. Since the chamber or chamber portion 18 of the uppermost cup in a stack, such as 21 in Fig. 2, is unsealed water instead of concentrate may be introduced and frozen to form a predetermined quantity of ice as shown at 23 in Fig. 2. Likewise, in order to inhibit "working" or growth of bacteria, etc. in the fresh concentrate (such as 19, Fig. 2), the air in the space above the concentrate 19 in a chamber 18 of a cup (as 22) between that cup and the adjacent cup (as 21) thereabove may be displaced by an inert gas introduced in that space for such purpose.

Any suitable inert gas may be used to displace the air between cups as shown in Fig. 2 and described above such as nitrogen or carbon dioxide. This may be introduced in the air space between cups by carrying out the cup nesting, stacking or assembling operation in an atmosphere of such gas or by the introduction of an appropriate air displacing gas-forming pellet or the like on or above the concentrate 19 in the chamber 18 before the sealing of the chamber by nesting of the adjacent cup thereto or therewith.

In the cups 24 and 25 of the embodiment shown in Figs. 3 and 4, the sidewalls are provided with integrally formed seal forming ring or band members 26 which, because of their resiliency, firmly engage the interior surface of the sidewall 14a of the cup therebelow frictionally to form a fluid tight seal while effecting the desired axial cup spacing for forming the concentrate containing chamber 18 as described above. As shown in Fig. 3, a small quantity of water may be introduced between the sidewalls 14a of adjacent nested cups (as 24 and 25) and frozen therein to produce an annular ice ring or band member enhancing the seal effected between the member 26 which is integral with one sidewall 14a and the interior surface of the sidewall 14a of the adjacent cup therebelow. Since the stack of cups is maintained at below freezing temperatures for preserving the concentrate 19, these ring or band members of ice will be maintained intact. The seal may likewise be enhanced by the application of a stripe or narrow band coating as 27 (Fig. 4) of a type hereinafter described.

It is, of course, to be understood that the seal forming members 17 and 20 of the embodiments of Figs. 1 and 2 may be formed integrally with the sidewalls 14 of the cups thereof as are the members 26 formed integrally with the sidewalls 14a. Likewise, the seal forming members 17, 20 and 26 may be located at any desired location heightwise of the cups. An advantage in locating the seal forming members, as 26 (Figs. 3 and 4) adjacent the lowermost portions of the cups is illustrated in Fig. 3 wherein it can be readily noted that the between-cup space above the concentrate chamber 18 and the concentrate therein is minimized and the necessity for the introduction of an air displacing inert gas, as illustrated in Fig. 2 is likewise minimized.

The fluid tight seal between the cups 31 and 32 in the embodiment illustrated in Fig. 5 is effected by means comprising a pair of spaced annular shoulders 33 and 34 formed integrally with the sidewalls 14b and forming between themselves an annular seat 35 for the annular resilient and/or adhesive band or gasket 36 which projects radially outwardly slightly beyond the shoulders 33 and 34 to engage the interior surface of the sidewall 14b of the adjacent cup in the stack, as shown. As also shown in Fig. 5, a thin sheet or layer 37 of ice may be applied to the top surface of the frosted or frozen concentrate in the chambers 18 of any of the cups of Figs. 1–5 to protect the concentrate 19 from exposure to the air entrapped between adjacent cups in a stack instead of the use of an inert gas, as shown in Fig. 2 to displace that air. This seal provided by the sheet or layer 37 may be applied by introducing a suitable quantity of water to each cup, above the previously introduced concentrate, and thereafter freezing this water to form the seal.

The seal and spacing members 17, 20 (Figs. 1, 2) and bands or gaskets 36 (Fig. 5) may comprise resilient material such as rubber, plastic, etc., frictionally or adhesively applied to the cup sidewalls or cast or formed directly thereon. They may be sufficiently yielding to provide and maintain air-tight intercup seals, after being set under the weight of the cups in the cup stacks. These members may likewise be formed by such materials as pointed out above, which are thermoplastic and subjected to localized applications of heat before the cups are nested and set in the stacks.

Where the seal forming members are formed integrally in the cup walls such as 26 (Figs. 3 and 4), the seal coating such as 27 (Fig. 4) may comprise any of the above described materials of which the members 17, 20 and 36 may be formed, applied in like manner, or they may comprise wax or paraffin coatings of suitable thickness and may be heated immediately before the cups are nested and "set" to form an airtight inter-cup seal. In forming the stacks of frozen concentrate containing cups according to this invention, the suitable quantity of "frosted" or frozen concentrate in fluent (i. e., pourable) state is first introduced into the individual cups and settled to level the top surface of the concentrate.

The cups are then nested and the seals "set" by application of axial telescoping force to the stack to render them air-tight. Then, if the seals are thermoplastic, localized heat and pressure is applied to the seal members to enhance the tightness of the inter-cup seals. If gas is to displace the air for inhibiting spoilage, the nesting and "setting" operations are carried out in a suitable inert gas atmosphere or pellets or the like are introduced above the concentrate in each cup before the nesting and setting operations.

Alternately, if an ice seal layer, such as 37 (Fig. 5) is to be utilized a suitable quantity of water is applied on the levelled top surface of the settled concentrate 19.

If the seal is to be aided by an ice ring as in Fig. 3, a suitable quantity of water is injected above the set sealing member therein before the succeeding cup is nested and set.

After the desired number of cups are nested and set, the complete stack is preferably subjected to a freezing operation and the stack is ready for sale as an article of commerce or for introduction to a suitable dispensing unit of the type described above.

It may be desirable in some cases, and especially where the efficacy of such seals depends upon the weight of the cup or package unit thereabove in a stack, that the uppermost cup in each stack be filled with a suitable quantity of water instead of concentrate in fluent state which water when frozen (as shown in Fig. 2), will perform the necessary functions of a like quantity of concentrate which would be imperfectly protected unless a protective ice layer such as 37 (Fig. 5) be formed in each cup of the stack.

From the above description it will clearly appear that I have provided new and improved methods of packaging and dispensing "frosted" or frozen beverage forming concentrates particularly adapted to "fresh" or unpasteurized concentrates though possessing various advantages for use in packaging pasteurized concentrates of the same general type and which methods embody new and improved packages for containing the concentrates in the absence of spoilage accelerating air from the packaging operation until the dispensing operation is completed thus materially simplifying the dispensing mechanism necessary and the servicing and upkeep necessary for sanitary and hygienic operation thereof.

This application is a continuation-in-part of my co-pending application Ser. No. 99,828, filed June 17, 1949, now abandoned.

In order most clearly to illustrate the principles of this invention in the drawing, the thickness and other dimensions of walls, coatings, etc., have been exaggerated and the shapes, forms and relative dimensions of seal forming members or portions of the various cup structures have been modified and exaggerated; likewise, while the illustrative cup structures shown are of the type formed of paper sheeting, it is comprehended and intended that the cups may be formed of other materials and by other methods as for instance of molded paper and other pulps and compositions.

It is, of course, to be understood that the above description is merely illustrative and in nowise limiting and that I desire to comprehend within my invention such modifications as are included within the scope of the following claims.

Having thus fully described my invention, what I claim as new and desire to secure by Letters Patent is:

1. The method of packaging frozen beverage forming concentrates for storage and dispensing purposes comprising introducing a predetermined quantity of said concentrate in each space provided between a plurality of predeterminedly spaced nested disposable cups and detachably sealing said cups together in fluid tight relation by a temperature responsive seal remaining intact while said concentrate is frozen.

2. The method defined in claim 1 wherein, the fluid tight temperature responsive seal is applied between sidewalls of adjacent nested cups.

3. The method of packaging frozen beverage forming concentrates for storage and dispensing purposes comprising introducing a predetermined quantity of said concentrate in each of the chambers provided between a plurality of predeterminedly spaced nested paper cups, and detachably sealing said cups together in fluid tight relation by a temperature responsive seal remaining intact while said concentrate is frozen while displacing the air between said cups by an inert gas.

4. In a method of packaging fresh frozen unpasteurized beverage forming concentrates, by the steps which comprise introducing into the lower end of each of a plurality of disposable cups with frusto-conical sidewalls a predetermined quantity of said concentrate in fluent state, nesting and maintaining said cups in predetermined axially spaced relation, sealing said predeterminedly spaced nested cups together in fluid tight relation by a temperature responsive seal remaining intact while said concentrate is frozen, and subjecting the stack formed by said nested cups to a freezing step fully to freeze and solidify said concentrate.

5. In a method of packaging fresh frozen beverage forming concentrate, the steps which comprise introducing into the lower end of each of a plurality of disposable paper cups with frusto-conical sidewalls a predetermined quantity of said concentrate in fluent state, nesting and maintaining said cups in predetermined axially spaced relation with an air-excluding inert gas filling the space between said nested cups unfilled by said concentrate, sealing said predeterminedly spaced nested cups detachably together in fluid tight relation by a temperature responsive seal remaining intact while said concentrate is frozen to prevent contact of said concentrate with air while said inter-cup seal is intact, and subjecting the stack formed by said concentrate loaded nested cups to a freezing step to solidify and preserve said concentrate from spoilage.

6. In a method of packaging unpasteurized beverage forming citrus concentrate, the steps which comprise introducing into the lower end of each of a plurality of disposable paper cups with frusto-conical sidewalls a predetermined quantity of said concentrate in fluent state, introducing a shallow sheet of water onto the upper surface of the concentrate in each of said cups, nesting and maintaining said cups in predetermined axially spaced relation, sealing said predeterminedly spaced nested cups together in fluid tight relation by a temperature responsive seal remaining intact while said concentrate is frozen, and subjecting the stack formed by said concentrate loaded nested cups to a freezing step to solidify said concentrate and convert the water sheets therein into air-proof ice sealing layers protecting the concentrate from direct contact with air.

7. The method defined in claim 6, wherein the concentrate is subjected to a solidifying freezing step prior to introduction of the water sheet to prevent admixture of concentrate with the water.

8. A package for frozen beverage forming concentrates comprising a plurality of disposable cups having inclined sidewalls, said cups being nested and disposed in predetermined axially spaced relation and forming therebetween chambers each containing a predetermined quantity of said frozen concentrate therein, and temperature responsive sealing means disposed between adjacent cups in said stack to maintain said adjacent cups in said predetermined spaced relation while forming a detachable fluid tight seal therebetween remaining intact while said concentrate is frozen.

9. A package as defined in claim 8, and temperature responsive air-excluding sealing means protecting the concentrate in each of said chambers comprising a relatively thin ice sheet covering said concentrate and remaining intact while said concentrate is frozen.

10. A package as defined in claim 8, said last named means including an ice sealing ring remaining intact while said concentrate is frozen.

11. A package as defined in claim 8 for storing and dispensing unpasteurized frozen citrus concentrate, said fluid tight seal including an ice ring.

12. As a new article of commence for use in vending devices, a disposable paper cup with an inclined annular sidewall and containing at its lower end a predetermined drink forming quantity of beverage forming frozen concentrate, and temperature responsive means on said cup cooperating with similar cups to form a stack of predeterminedly axially spaced concentrate containing cups connected by fluid tight seals remaining intact while said concentrate is frozen.

13. A new article of commerce consisting of a disposable paper cup having an annular inclined side wall, a single drink forming quantity of fresh frozen beverage forming concentrate within said cup at the lower end thereof, and a thin sheet of ice covering the upper surface of said concentrate forming a temperature responsive air excluding seal for said concentrate and remaining intact while said concentrate is maintained frozen.

JOHN H. KAUFFMAN.

References Cited in the file of this patent

UNITED STATES PATENTS

| Number | Name | Date |
|---|---|---|
| 1,137,039 | Weber | Apr. 27, 1915 |
| 1,709,168 | Epperson | Apr. 16, 1929 |
| 1,770,118 | Williams | July 8, 1930 |
| 1,889,111 | Serr | Nov. 29, 1932 |
| 2,062,897 | Michel et al. | Dec. 1, 1936 |
| 2,091,723 | Sterino | Aug. 31, 1937 |
| 2,522,221 | Gorton | Sept. 12, 1950 |